US008628188B2

(12) United States Patent
Tokisawa et al.

(10) Patent No.: US 8,628,188 B2
(45) Date of Patent: Jan. 14, 2014

(54) DRYING APPARATUS AND PRINTING APPARATUS

(75) Inventors: Toshiaki Tokisawa, Yokohama (JP); Yoshiaki Suzuki, Nagareyama (JP); Kanto Kurasawa, Kawasaki (JP); Toshihide Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 12/962,074

(22) Filed: Dec. 7, 2010

(65) Prior Publication Data

US 2011/0261128 A1 Oct. 27, 2011

(30) Foreign Application Priority Data

Apr. 22, 2010 (JP) ................................ 2010-099150

(51) Int. Cl.

| | |
|---|---|
| ***B41J 2/01*** | (2006.01) |
| *B41J 3/407* | (2006.01) |
| *F26B 3/34* | (2006.01) |
| *F26B 5/04* | (2006.01) |
| *F26B 3/00* | (2006.01) |
| *F26B 9/00* | (2006.01) |
| *F26B 13/00* | (2006.01) |
| *F26B 13/06* | (2006.01) |
| *B41L 35/14* | (2006.01) |
| *H05B 1/00* | (2006.01) |
| *H05B 3/00* | (2006.01) |
| *H05B 11/00* | (2006.01) |
| *G01D 9/00* | (2006.01) |
| *G03G 15/20* | (2006.01) |

(52) U.S. Cl.

USPC ........... 347/102; 347/101; 347/104; 347/105; 347/106; 34/273; 34/274; 34/414; 34/419; 34/444; 34/445; 34/446; 34/447; 34/448; 34/611; 34/618; 101/488; 219/216; 346/25; 399/320

(58) Field of Classification Search

USPC ............ 347/101, 102, 104–106; 34/273, 274, 34/414, 419, 444–448, 611, 618; 101/488; 219/216; 346/25; 399/320

See application file for complete search history.

(56) References Cited

U.S. PATENT DOCUMENTS

| | | | | |
|---|---|---|---|---|
| 5,204,723 | A * | 4/1993 | Hanada et al. | 399/335 |
| 5,402,211 | A * | 3/1995 | Yoshikawa | 399/331 |
| 6,288,370 | B1 * | 9/2001 | Ogawa et al. | 219/469 |
| 6,297,476 | B1 * | 10/2001 | Kashino et al. | 219/216 |

(Continued)

FOREIGN PATENT DOCUMENTS

JP 2000-221658 A 8/2000

*Primary Examiner* — Laura Martin
*Assistant Examiner* — Jeremy Bishop
(74) *Attorney, Agent, or Firm* — Canon U.S.A., Inc. IP Division

(57) ABSTRACT

The invention provides an apparatus including: a rotatable belt having an outer surface and an inner surface, the outer surface partially coming into contact with a sheet; a plurality of rollers being arranged in a direction of movement of the sheet and including a first roller and a second roller adjacent to each other, the plurality of rollers being pressed against the outer surface and the moving sheet being nipped between the plurality of rollers and the outer surface; a blowing mechanism configured to blow hot air from between the first roller and the second roller toward the sheet; and a heating unit including a heater and a contact surface coming into contact with the inner surface, the heating unit being configured to be able to set the contact surface thereof to have a predetermined non-uniform temperature distribution.

14 Claims, 5 Drawing Sheets

(56) References Cited

U.S. PATENT DOCUMENTS

| | | | | |
|---|---|---|---|---|
| 6,411,320 | B1 * | 6/2002 | Mcdaniel et al. | 347/212 |
| 6,536,863 | B1 * | 3/2003 | Beauchamp et al. | 347/17 |
| 6,554,514 | B2 * | 4/2003 | Wotton et al. | 400/648 |
| 6,893,122 | B2 * | 5/2005 | Shima et al. | 347/102 |
| 7,077,584 | B2 * | 7/2006 | Yoshida | 396/571 |
| 7,215,350 | B2 * | 5/2007 | Torisawa | 347/140 |
| 7,283,144 | B2 * | 10/2007 | Horiuchi et al. | 347/140 |
| 7,362,344 | B2 * | 4/2008 | Kama | 347/140 |
| 7,405,744 | B2 * | 7/2008 | Denawa | 347/171 |
| 7,787,816 | B2 * | 8/2010 | Kladias et al. | 399/400 |
| 8,182,080 | B2 * | 5/2012 | Kawakami et al. | 347/102 |
| 2007/0146456 | A1 * | 6/2007 | Tanabe | 347/101 |
| 2007/0166071 | A1 * | 7/2007 | Shima | 399/94 |

* cited by examiner

DRYING APPARATUS AND PRINTING APPARATUS

BACKGROUND OF THE INVENTION

1. Field of the Invention

The present invention relates to a drying apparatus configured to dry sheets having a high moisture content after printing, and a printing apparatus.

2. Description of the Related Art

In Japanese Patent Laid-Open No. 2000-221658, a drying apparatus configured to dry wet sheets (photosensitive material) in a short time is disclosed. The sheets are dried by blowing hot air onto the surfaces of the sheets carried by a conveying belt in the drying apparatus. Simultaneously, a heating unit is provided on the side of the back surface of the conveying belt to heat the sheets from the back surfaces by heating the conveying belt, thereby accelerating drying of the sheets.

When blowing hot air onto a sheet as described in Japanese Patent Laid-Open No. 2000-221658, it is difficult to blow an airflow evenly over a sheet surface. Therefore, uneven drying energy is applied to the sheet surface, and hence uneven drying may result. The uneven drying may cause unevenness of the image on the sheet. Therefore, the invention provides an apparatus which is capable of applying drying energy more evenly to the sheet than in the related art and which is capable of reducing the probability of uneven drying.

In a field such as a print laboratory where a large amount of printing is required, how to increase the printing speed while maintaining image quality is a challenge. There is also an increasing demand for printing on both sides of the sheet considering binding of photo books or the like. One of key points for increasing the printing speed is how much the sheet drying time can be shortened. In particular, a large amount of ink is applied on the front and back surfaces of the sheet in the case of duplex printing. Therefore, shortening of the drying time contributes significantly to an improvement of a total print throughput. Accordingly, the present invention provides an apparatus which is capable of performing duplex printing extremely quickly using a continuous sheet.

SUMMARY OF THE INVENTION

A first aspect of the present invention is an apparatus for drying a sheet, including a rotatable belt having an outer surface and an inner surface, a part of the outer surface being into contact with a sheet, a plurality of rollers arranged in a direction of movement of the sheet, the rollers including a first roller and a second roller adjacent to each other, the plurality of rollers being pressed against the outer surface with the moving sheet being held between the plurality of rollers and the outer surface, a blowing mechanism configured to blow hot air from between the first roller and the second roller toward the sheet; and a heating unit including a heater and a contact surface coming into contact with the inner surface, the heating unit being configured to be set so that the contact surface has a predetermined non-uniform temperature distribution.

A second aspect of the present invention is an apparatus for performing duplex printing including a sheet feeding unit configured to feed a sheet along a path, wherein the sheet is continuous; a printing unit, disposed in the path, configured to perform inkjet printing on the sheet, a cutter unit, disposed downstream of the printing unit in the path, configured to cut the sheet, a drying unit, disposed downstream of the cutter unit in the path, configured to dry the sheet printed in the printing unit, and a reverse unit configured to reverse the sheet that has passed through the drying unit, wherein the drying unit includes a rotatable belt having an outer surface and an inner surface, a part of the outer surface being into contact with the sheet a plurality of rollers arranged in a direction of movement of the sheet, the rollers including a first roller and a second roller adjacent to each other, the plurality of rollers being pressed against the outer surface with the moving sheet being held between the plurality of rollers and the outer surface, a blowing mechanism configured to blow hot air from between the first roller and the second roller toward the sheet; and a heating unit including a heater and a contact surface coming into contact with the inner surface, the heating unit being configured to be set so that the contact surface has a predetermined non-uniform temperature distribution.

Further features of the present invention will become apparent from the following description of exemplary embodiments with reference to the attached drawings.

DESCRIPTION OF THE EMBODIMENTS

An embodiment of an inkjet printing apparatus will now be described. The printing apparatus in this embodiment is a high-speed line printer using an elongated continuous sheet (an elongated continuous sheet longer than a print unit (referred to as one page or unit image) repeated in the direction of conveyance) and supporting both simplex printing and duplex printing. For example, this high-speed line printer is suitable for a field such as a print laboratory where a large amount of printing is performed. In this specification, even when a plurality of small images, characters, and spaces are mixed in an area of a single print unit (one page), all the elements included in the area are collectively referred to as a unit image. In other words, the term “unit image” means one print unit (one page) when printing a plurality of pages in sequence on a continuous sheet. It may be referred to simply as an image instead of the unit image. The length of the unit image depends on the image size to be printed. For example, the length of an L-size picture in the direction of conveyance is 135 mm, the length of an A4-size sheet in the direction of conveyance is 297 mm.

The present invention can be widely applied to printing apparatuses using ink and requiring drying such as printers, multifunction peripherals, copying machines, facsimile machines, and manufacturing apparatuses for a variety of devices. The present invention can also be applied to printing apparatuses which are configured to perform printing through a liquid development method by drawing latent images on a sheet applied with photosensitive material using a laser or the like. Furthermore, the present invention can be applied to sheet processing apparatuses configured to perform not only printing, but also a variety of processes which require drying of the continuous sheet (recording, working, application, irradiation, reading, inspecting, etc.).

Figure 1:
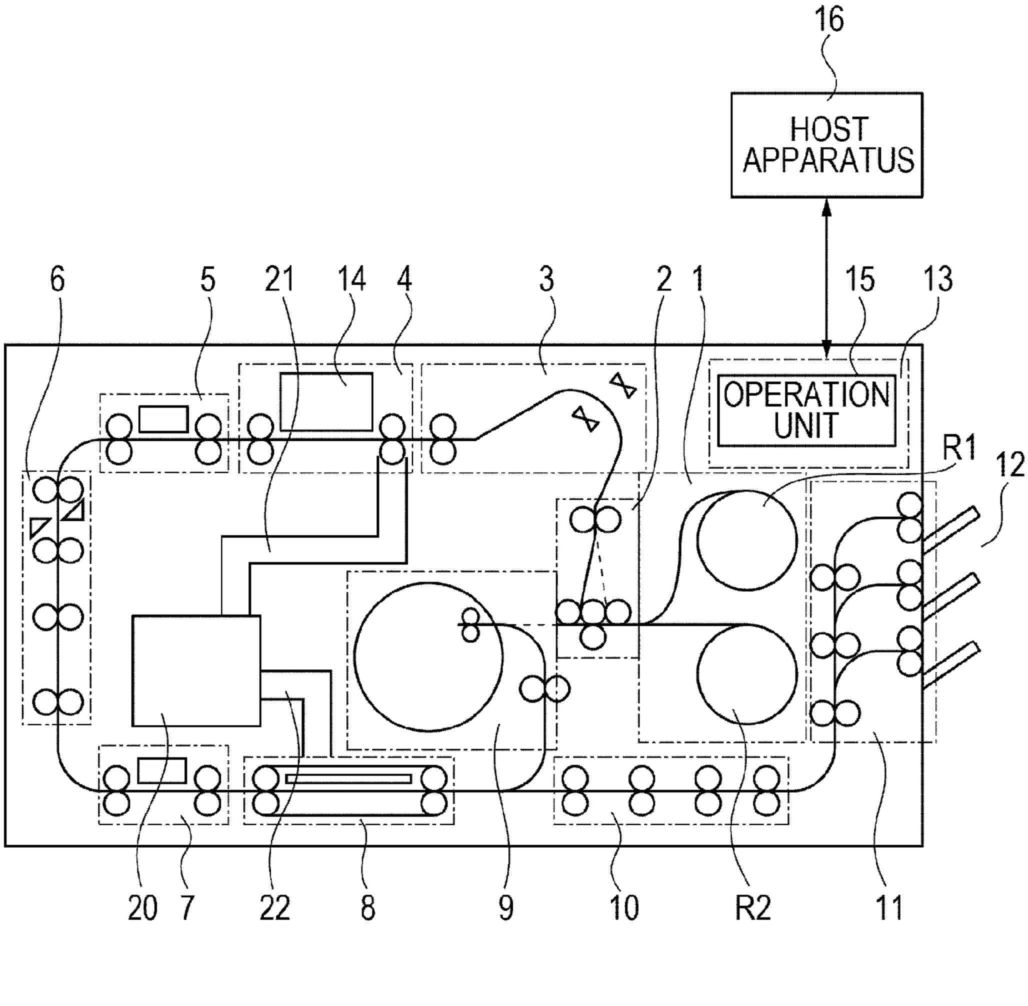
FIG. 1 is a schematic drawing showing an internal configuration of a printing apparatus.

FIG. 1 is a schematic cross-section showing the internal configuration of the printing apparatus. The printing apparatus in this embodiment is configured to use a roll sheet and be capable of performing duplex printing on a first surface of a sheet and a second surface, which is the back side of the first surface. The printing apparatus generally includes a sheet feeding unit 1, a decurling unit 2, a skew correcting unit 3, a printing unit 4, an inspection unit 5, a cutter unit 6, an information recording unit 7, a drying unit 8, a reverse unit 9, a discharge conveyance unit 10, a sorter unit 11, a discharging portion 12, a humidifying unit 20, and a control unit 13 therein. The sheet is conveyed by a conveying mechanism including roller pairs and a belt along a sheet conveying path shown by a solid line in the drawing, and is subjected to processes in the respective units. The sheet is conveyed downstream along the sheet conveyance path while printing. At an arbitrary position in the sheet conveyance path where the sheet is conveyed from feeding means to discharging means, a side toward the feeding means is referred to as "the upstream side", and the opposite side toward the discharging means is referred to as "the downstream side".

The sheet feeding unit 1 is a unit configured to hold and feed a continuous roll sheet. The sheet feeding unit 1 is capable of accommodating two rolls R1 and R2, and is configured to alternately withdraw and feed a sheet. The number of rolls to be accommodated in the sheet feeding unit 1 is not limited to two, and configurations in which one or three or more rolls are accommodated are also applicable. The sheet is not limited to a roll sheet as long as it is a continuous sheet. For example, a continuous sheet perforated at every unit length, accordion folded at every perforation and stacked, and accommodated in the sheet feeding unit 1 is also applicable.

The decurling unit 2 is a unit configured to alleviate curling (warping) of the sheet fed from the sheet feeding unit 1. The decurling unit 2 alleviates the curling using two pinch rollers per one driving roller and applying a decurling force to the sheet by causing the sheet to pass therethrough while giving a curl to the sheet in the opposite direction.

The skew correcting unit 3 is a unit to correct a skew (inclination with respect to a supposed direction of travel) of the sheet passed through the decurling unit 2. The skew of the sheet is corrected by pressing a sheet edge as a reference side against a guiding member.

The printing unit 4 is a unit configured to form an image by performing printing on the sheet being conveyed from above the sheet using a printhead 14. The printing unit 4 also includes a plurality of conveying rollers configured to convey the sheet. The printhead 14 has an inkjet-type line printhead having nozzle rows formed thereon within a range which covers a maximum width of a sheet supposed to be used. The printhead 14 includes a plurality of printheads arranged in parallel in the direction along the direction of conveyance. In this example, the printhead 14 includes seven printheads corresponding to seven colors, namely, C (cyan), M (magenta), Y (yellow), LC (light cyan), LM (light magenta), G (gray), and K (black). The number of colors and the number of printheads are not limited to seven. Examples of inkjet system which can be employed here include a system using a heater, a system using a piezoelectric element, a system using an electrostatic element, and a system using a MEMS element. Inks of respective colors are supplied from ink tanks to the printhead 14 via respective ink tubes.

The inspection unit 5 is a unit configured to optically scan a test pattern or an image printed on the sheet by the printing unit 4 using a scanner, and determine whether or not the image is normally printed by inspecting the state of nozzles of the printheads, the state of conveyance of the sheet, the position of the image, and so on. The scanner includes a CCD image sensor or a CMOS image sensor.

The cutter unit 6 is a unit including a mechanical cutter configured to cut the sheet after the sheet has been subjected to printing into a predetermined length. The cutter unit 6 also includes a plurality of conveying rollers configured to feed the sheet to a subsequent process.

The information recording unit 7 is a unit configured to record print information (specific information) such as a serial number or a date of printing on a non-printed area of the cut sheet. The recording is achieved by printing characters or codes through an inkjet system or a thermal transfer system.

The drying unit 8 is a sheet drying apparatus configured to heat the sheet printed by the printing unit 4 to dry the ink applied thereto in a short time. A printed surface of the sheet having the ink applied thereto and hence to be dried faces downward (toward the floor) when passing through the drying unit 8. In the drying unit 8, hot air is applied to the sheet passing therethrough at least from the lower side to dry the surface having the ink applied thereto.

A sheet conveying path from the sheet feeding unit 1 to the drying unit 8 as described above is referred to as a first path. The first path has a shape making a U-turn from the printing unit 4 to the drying unit 8, and the cutter unit 6 is positioned at a midpoint of the U-turn shape.

The reverse unit 9 is a unit configured to wind the continuous sheet after having finished the printing on the front surface temporarily and reverse the continuous sheet so as to be upside down when performing the duplex printing. The reverse unit 9 is provided at a midpoint of a path (a loop path) (referred to as a second path) extending from the drying unit 8 via the decurling unit 2 to the printing unit 4 for feeding the sheet having passed through the drying unit 8 to the printing unit 4 again. The reverse unit 9 includes a winding rotary member (drum) which rotates so as to wind up the sheet. The continuous sheet having printed on the front surface thereof but not cut off yet is temporarily wound by the winding rotary member. After having finished the winding, the winding rotary member rotates reversely, and the sheet having been wound thereonto is fed to the decurling unit 2 in reverse order from the winding procedure, and then fed to the printing unit 4. Since the sheet at this time is reversed so as to be upside down, printing on the back side can be performed by the printing unit 4. More specific actions to be taken at the time of the duplex printing will be described later.

The discharge conveyance unit 10 is a unit configured to convey the sheet cut by the cutter unit 6 and dried by the drying unit 8 and deliver the sheet to the sorter unit 11. The discharge conveyance unit 10 is provided in a path (referred to as a third path) different from the second path where the reverse unit 9 is provided. A path switching mechanism having a movable flapper is provided at a branch position of the path for guiding the sheet conveyed through the first path selectively to one of the second path and the third path.

The sorter unit 11 and the discharging portion 12 are provided at the side of the sheet feeding unit 1 and at a terminal end of the third path. The sorter unit 11 is a unit configured to sort the printed sheets into groups as needed. The sorted sheets are discharged to the discharging portion 12 including a plurality of trays. In this manner, the third path has a layout passing below the sheet feeding unit 1 and discharging the sheets to the opposite side from the printing unit 4 and the drying unit 8 with respect to the sheet feeding unit 1.

As described above, the units from the sheet feeding unit 1 to the drying unit 8 are provided in sequence along the first path. The downstream side of the drying unit 8 branches into the second path and the third path, and the second path is provided with the reverse unit 9 at the midpoint thereof, and the downstream side of the reverse unit 9 merges with the first path. The discharging portion 12 is provided at the terminal end of the third path.

The humidifying unit 20 is a unit configured to generate and supply humidifying gas (air) between the printhead 14 of the printing unit 4 and the sheet. Accordingly, drying of the ink in the nozzles of the printhead 14 is restrained. Examples of the humidifying system which may be employed in the humidifying unit 20 include those of a vaporization type, a water spraying type, and a steam generating type. Examples of a humidifying system of a vaporization type include those of a moisture permeable film type, a drop pervaporation type, and a capillary type in addition to a rotating type in this embodiment. Examples of a humidifying system of a water spraying type include those of an ultrasonic wave type, a centrifugal type, a high-pressure spray type, and a dual fluid spraying type. Examples of a humidifying system of a steam generating type include those of a steam line type, an electro thermal type, and an electrode type. The humidifying unit 20 and the printing unit 4 are connected via a first duct 21, and the humidifying unit 20 and the drying unit 8 are connected via a second duct 22. In the drying unit 8, high-moisture and high-temperature gas is generated when drying the sheet. The gas is exhausted from the drying unit 8, is introduced into the humidifying unit 20 via the second duct 22, and is used as auxiliary energy for generating the humidifying gas in the humidifying unit 20. Then, the humidifying gas generated in the humidifying unit 20 is introduced into the printing unit via the first duct 21. The high-temperature and high-humidity gas exhausted from the drying unit 8 is not discharged out from the apparatus as-is, but is used as an aid for generating the humidifying gas in the humidifying unit 20. Therefore, the energy efficiency in the total system of the apparatus is significantly improved.

The control unit 13 is a unit which is responsible for controlling respective portions of the entire print apparatus. The control unit 13 includes a controller having a CPU, memories and various kinds of control units, an external interface, and an operation unit 15 which allows users to perform input and output. The action of the printing apparatus is controlled on the basis of commands from a host apparatus 16 such as the controller or a host computer connected to the controller via the external interface.

Figure 2:
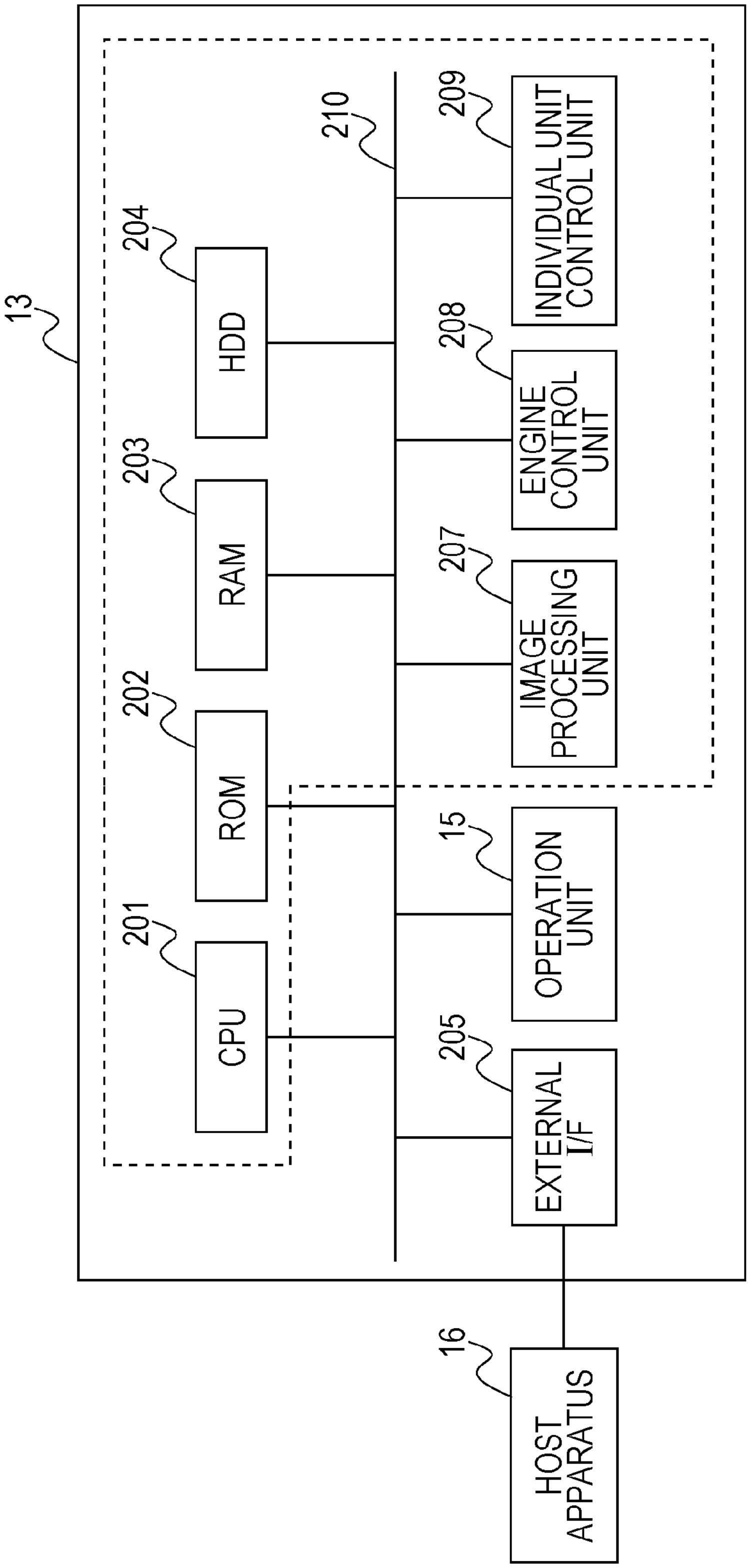
FIG. 2 is a block diagram of a control unit.

FIG. 2 is a block diagram showing the concept of the control unit 13. The controller (a portion surrounded by a broken line) included in the control unit 13 is made up of a CPU 201, a ROM 202, a RAM 203, a HDD 204, an image processing unit 207, an engine controller 208, and an individual unit controller 209. The CPU 201 (Central Processing Unit) performs integrative control of the actions of the respective units in the printing apparatus. The ROM 202 stores fixed data required for programs executed by the CPU 201 and respective actions of the printing apparatus. The RAM 203 is used as a work area for the CPU 201, is used as a temporary storage area for various received data, and is used for storing various setting data. The HDD 204 (Hard Disk) is capable of storing and retrieving the programs executed by the CPU 201, the print data, and set information required for various actions of the printing apparatus. The operation unit 15 is an I/O interface for users, and includes an input portion such as hard keys or a touch panel, and an output portion such as a display or a voice generator which presents information.

Specific processors are provided for units which require high-speed data processing. The image processing unit 207 performs the image processing of print data handled by the printing apparatus. The image processing unit 207 converts a color space of input image data (for example, YCbCr) into a standard RGB color space (for example, sRGB). The image processing unit 207 also performs various types of image processing such as resolution conversion, image analysis, image correction, and so on for image data. Print data after having been subjected to the image processing as described above is stored in the RAM 203 or in the HDD 204. The engine controller 208 performs drive control of the printhead 14 of the printing unit 4 according to the print data on the basis of the control commands received from the CPU 201 or the like. The engine controller 208 also performs control of conveyance mechanisms in the respective units in the printing apparatus. The individual unit controller 209 is a sub controller configured to individually control the respective units of the sheet feeding unit 1, the decurling unit 2, the skew correcting unit 3, the inspection unit 5, the cutter unit 6, the information recording unit 7, the drying unit 8, the reverse unit 9, the discharge conveyance unit 10, the sorter unit 11, the discharging portion 12, and the humidifying unit 20. The actions of the respective units are controlled by the individual unit controller 209 on the basis of the commands issued from the CPU 201. An external interface 205 is an interface (I/F) for connecting the controller to the host apparatus 16, and is a local I/F or a network I/F. The components described above are connected using a system bus 210.

Subsequently, the basic actions to be performed at the time of printing will be described. As the printing actions in the simplex printing mode are different from those in the duplex printing mode, descriptions will be made for both of them separately.

In the simplex printing mode, a sheet fed from the sheet feeding unit 1 and subjected to the processes in the decurling unit 2 and the skew correcting unit 3 respectively is printed on the front surface (first surface) in the printing unit 4. Images (unit images) each having a predetermined unit length in the direction of conveyance are printed in sequence, so that a plurality of images are formed in line. The printed sheet passes through the inspection unit 5, and is cut into unit images in the cutter unit 6. The information recording unit 7 records print information on the back surfaces of the cut sheets as needed. The cut sheets are conveyed one by one to the drying unit 8, and are dried thereby. Subsequently, the cut sheets pass through the discharge conveyance unit 10, and are discharged and stacked in sequence in the discharging portion 12 of the sorter unit 11. In contrast, the sheet remaining in the printing unit 4 after the last unit image has been cut is fed back to the sheet feeding unit 1, and is wound around the roll R1 or R2. In this manner, in the simplex printing, the sheet passes through the first path and the third path, and is processed therein, but does not pass through the second path.

In contrast, in the duplex printing, a back surface (second surface) print sequence is performed subsequently to the front surface (first surface) print sequence. In the first front surface print sequence, the actions of the respective units from the sheet feeding unit 1 to the inspection unit 5 are the same as those in the simplex printing described above. The cutting action is not performed by the cutter unit 6, and the sheet is conveyed to the drying unit 8 in the state of a continuous sheet. After having dried the ink on the front surface in the drying unit 8, the sheet is guided to a path (second path) on the side of the reverse unit 9 instead of the path (third path) on the side of the discharge conveyance unit 10. In the second path, the sheet is wound on the winding rotary member of the reverse unit 9, which rotates in the normal direction (counterclockwise in the drawing). When the predetermined printing on the front surface by the printing unit 4 is ended, a trailing end of the printed area of the continuous sheet is cut by the cutter unit 6. The continuous sheet on the downstream side (printed side) with respect to the cutting position in the direction of conveyance passes through the drying unit 8 and is wound entirely by the reverse unit 9 until the trailing end of the sheet (cutting position). In contrast, simultaneously with the winding of the sheet by the reverse unit 9, the continuous sheet remaining on the upstream side (the side of the printing unit 4) with respect to the cutting position in the direction of conveyance is fed back to the sheet feeding unit 1 so that a leading end (cutting position) of the sheet does not remain in the decurling unit 2, and is wound by the roll R1 or R2. This feeding back movement (back feed) contributes to avoid collision with a sheet fed again for the back surface print sequence described below.

The printing mode is switched to the back surface print sequence after the front surface print sequence described above. The winding rotary member of the reverse unit 9 rotates in the opposite direction (clockwise in the drawing) from the direction at the time of winding. An end of the wound sheet (the trailing end of the sheet at the time of winding corresponds to the leading end at the time of feeding) is fed to the decurling unit 2 along the path indicated by a broke line in the drawing. In the decurling unit 2, the curl formed by the winding rotary member is straightened. In other words, the decurling unit 2 is a common unit provided between the sheet feeding unit 1 and the printing unit 4 in the first path and between the reverse unit 9 and the printing unit 4 in the second path, and functions to decurl the sheet in the both paths. The sheet reversed so as to be upside down is fed to the printing unit 4 via the skew correcting unit 3, and is printed on the back surface thereof. The printed sheet passes through the inspection unit 5, and is cut into preset unit lengths in the cutter unit 6. Since the cut sheets are printed on both surfaces thereof, and recording in the information recording unit 7 is not performed. The cut sheets are conveyed one by one to the drying unit 8, pass through the discharge conveyance unit 10, and are discharged and stacked in sequence in the discharging portion 12 of the sorter unit 11. In this manner, in the duplex printing, the sheet passes through the first path, the second path, the first path, and the third path in sequence and is processed therein.

Figure 3:
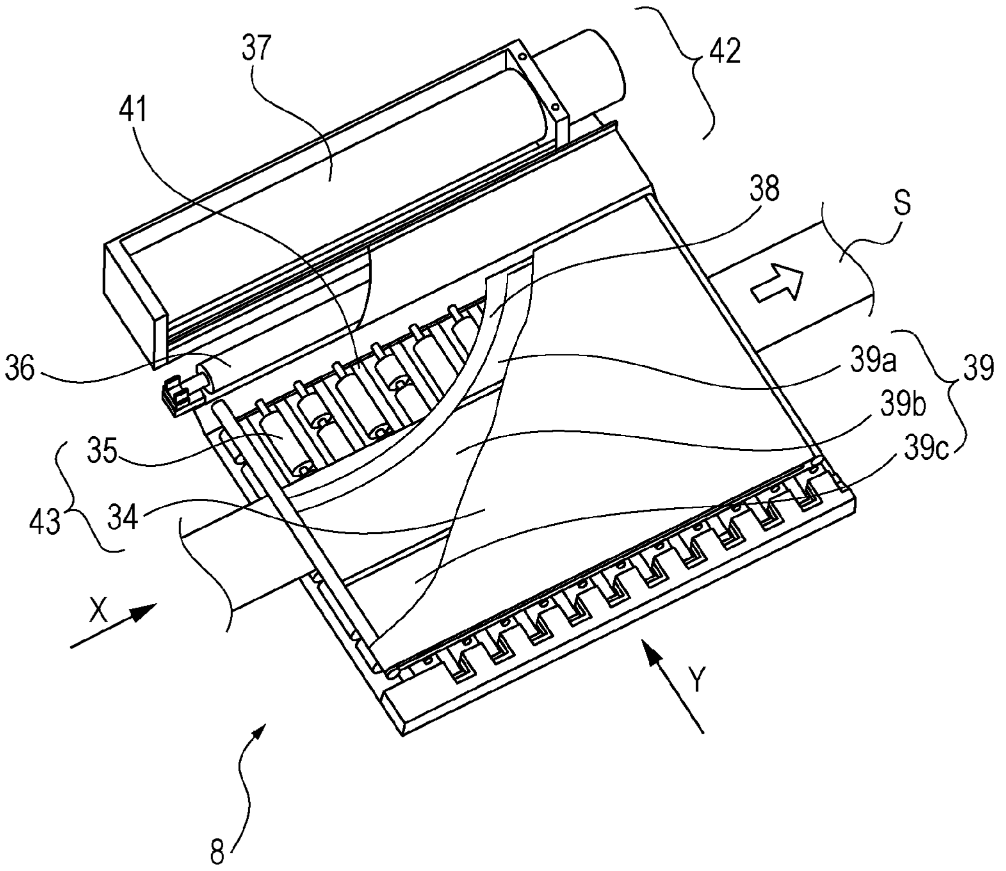
FIG. 3 is a perspective view of a drying unit.
Figure 4:
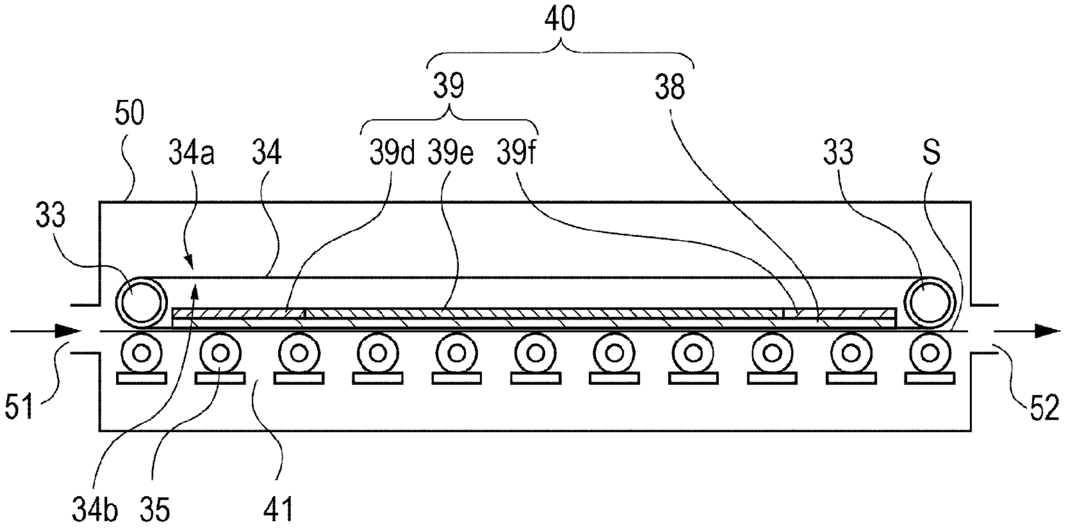
FIG. 4 is a cross-sectional view of the drying unit.

Subsequently, the drying unit 8 in the printing apparatus having the configuration as described above will be described further in detail. FIG. 3 is a perspective view showing an internal structure of the drying unit 8, and FIG. 4 is a cross-sectional view of the drying unit 8 viewed in the direction indicated by an arrow Y in FIG. 3. The sheet applied with ink in the printing unit 4 and conveyed therefrom pass through the cutter unit 6 and the information recording unit 7, and is introduced into the drying unit 8 in the direction indicated by an arrow X in FIG. 3. The drying unit 8 has a housing 50 (an apparatus housing of the drying apparatus) and the housing 50 includes a hot air generating unit 42 (blowing mechanism) and a conveying unit 43 integrated therein. It is also possible to provide the hot air generating unit 42 outside the housing 50 and connect the both with respect to each other.

The conveying unit 43 includes a belt 34 which is a belt having the form of a rotatable endless belt, and a plurality of rollers 35 (driven rollers) arranged along the direction of conveyance so as to oppose the belt 34. The belt 34 includes an outer surface 34*a* and an inner surface 34*b*, and the outer surface 34*a* partially comes into contact with a sheet S or the roller 35. The roller 35 is urged upward by a predetermined urging force. A plurality of belt driving rollers 33 for supporting and rotating the belt 34 in a tensed state are provided in a space surrounded by the inner surface 34*b* of the belt 34. At least one of the belt driving rollers 33 has a rotational driving force, and rotates the belt 34. The distance between the adjacent rollers 35 is shorter than the length of the smallest cut sheet. The sheet advances in the drying unit 8 smoothly while being nipped between the belt 34 and the rollers 35 irrespective of whether the sheet introduced into the drying unit 8 is a continuous sheet or a cut sheet. Hot air is blown onto the sheet passing therethrough at least from the underside to dry the surface applied with the ink. The sheet can easily be warped due to the rapid drying. However, since the sheet is nipped between the belt 34 and the rollers 35 during the drying process, the sheet is restrained from being warped.

Provided in the space surrounded by the inner surface 34*b* of the belt 34 is a heater unit 40 including a heat conductor plate 38 and a planar heater 39 provided integrally with each other. The front surface of the heat conductor plate 38 corresponds to a contact surface which comes into surface contact with the inner surface 34*b* of the belt 34. The planar heater 39 has a structure divided into a plurality of blocks (three planar heaters 39*a*, 39*b*, and 39*c* in this example) arranged in the direction of the width of the sheet S. The temperature distribution of the contact surface is variable by controlling the heating capacities of the divided heaters respectively, so that a non-uniform predetermined temperature distribution can be set. The heat generated by the planar heater 39 is transferred to the heat conductor plate 38 as a thermal conductor. When the belt 34 is rotated, the inner surface 34*b* of the belt 34 is slid on the surface of the heat conductor plate 38 while keeping a surface contact therewith. The heat is transferred from the heat conductor plate 38 to the belt 34 through the contact, and hence the temperature of the entire belt 34 rises. When the sheet is conveyed through the interior of the drying unit 8, the outer surface of the belt 34 comes into surface contact with the sheet, and hence the sheet is heated. Therefore, drying of the sheet is accelerated.

The plurality of rollers 35 are pressed against the outer surface 34*a* of the belt 34 respectively with a predetermined urging force. There are two significances of the provision of the plurality of rollers 35. Firstly, the sheet S is firmly nipped between the rollers 35 and the belt 34 to ensure the conveyance of the sheet in the drying unit 8. Secondly, by pressing the outer surface 34*a* of the belt 34 with the rollers 35, the moving sheet S is brought into reliable contact with the outer surface 34*a* of the belt 34, and the inner surface 34*b* of the belt 34 and the contact surface of the heat conductor plate 38 are reliably brought into contact with each other. If such contact is ensured, the heat of the heater unit 40 is transferred to the belt 34 with high efficiency, and the heat of the belt 34 is transferred to the sheet S with high efficiency. If the rollers 35 do not exist, gaps (air layers) can easily be formed between the inner surface 34*b* of the belt 34 and the contact surface of the heat conductor plate 38, and between the outer surface 34*a* of the belt 34 and the sheet S, so that the heat transfer to the back surface of the sheet S may become insufficient. In order to enhance the effects of the heat transfer, three or more rollers 35 are preferably provided. In this example, nine rollers 35 are arranged so as to oppose the heat conductor plate 38.

The belt 34 and the heat conductor plate 38 both are desired to have a high thermal conductivity. The heat is desired to be transferred from the contact surface of the heat conductor plate 38 to the belt 34 with a least loss. Therefore, the belt 34 formed by coating fibers having heat-resisting properties such as Kevler or aramid with rubber such as silicon containing carbon which is superior in thermal conductivity can be used. The material of the heat conductor plate 38 may be materials superior in thermal conductivity such as metallic materials such as aluminum, copper, and stainless steel, or carbon graphite resin material. It is also possible to omit the heat conductor plate 38 so that the surface of the planar heater 39 comes into surface contact directly with the inner surface 34*b* of the belt 34.

When the running time of the apparatus (the rotating period of the belt) becomes long, the inside of the belt 34 is worn, and hence slippage may occur with respect to the belt driving roller 33. Then, the rotating speed of the belt 34 is lowered than normal, and accuracy of the speed of sheet conveyance in the drying unit 8 is impaired. In order to restrain this event, a countermeasure to minimize wearing of the belt caused by the contact surface of the heater unit 40 is desired. Since the belt 34 is a flexible member, the contact with the contact surface results in wearing of the belt 34. In order to restrain the wearing of the belt 34, reduction of the frictional drag is effective. Therefore, the outer surface 34*a* of the belt 34 is provided with a larger coefficient of friction than the inner surface 34*b* and the contact surface. For example, the coefficients of friction of the inner surface 34*b* and the contact surface, respectively (or frictional drag of between the both) are preferably set within a range of numerical values from 0.2 to 0.5. Accordingly, the outer surface 34*a* of the belt 34 reliably holds the sheet S, and the friction of the belt 34 due to the contact friction between the inner surface 34*b* and the contact surface is restrained.

The hot air generating unit 42 is a blowing mechanism configured to circulate hot air in the interior of the housing 50 of the drying unit 8, and blow the hot air to the sheet. The hot air generating unit 42 includes a heater 36 configured to generate hot air by rising the temperature (heating) air and a fan 37 configured to circulate the hot air and blow the same to the sheet. The hot air blown by the fan 37 is ejected upward through a plurality of slit-shaped ejection ports 41 arranged at positions corresponding to the gaps between the rollers 35, and is blown onto the sheet surface. Subsequently, the hot air is returned back again to the fan 37, and circulates in the interior of the housing 50. In other words, the both surfaces of the sheet are heated by the hot air blown from the hot air generating unit 42 onto the front surface and heating by the belt 34 from the back surface thereof, so that drying action with high degree of efficiency is achieved.

Figure 5:
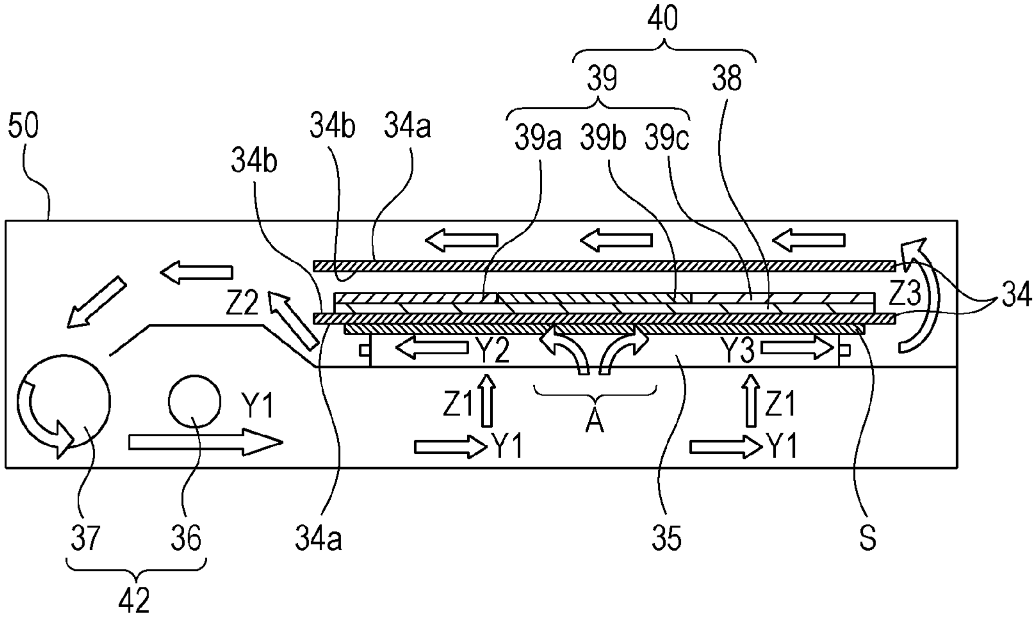
FIG. 5 is a cross-sectional view of the drying unit.

Circulation of the hot air in the interior of the drying unit 8 will be described. FIG. 5 is a cross-sectional view of the drying unit 8 viewed from the direction indicated by the arrow X in FIG. 3. The gas is heated by the heater 36, and is fed as hot air by the fan 37 in the direction indicated by arrows Y1. Provided at positions corresponding to portions between given adjacent two rollers (first roller, second roller) from among the plurality of rollers 35 are the ejection ports 41 for blowing the hot air toward the sheet S from between the two rollers. The hot air is ejected upward (the direction indicated by arrows Z1) from the plurality of slit-shaped ejection ports 41 and is blown onto the sheet. The hot air passing through the respective ejection ports 41 hits onto the sheet in an area A, and separately flows in two directions (the direction indicated by an arrow Y2 and the direction indicated by an arrow Y3) in the direction of the width of the sheet. The air flow flowing in the direction indicated by the arrow Y2 passes through an arrow Z2 and is returned back to the fan 37. The air flow flowing in the direction indicated by the arrow Y3 passes through an arrow Z3 and is returned back to the fan 37. Then the air flow is fed as hot air again by the fan 37 and the heater 36. In other words, a flow of the hot air circulating in the internal space of the housing 50 of the drying unit 8 is formed.

The airflow quantity of the hot air ejecting upward from the ejection ports 41 and flowing on the surface of the sheet in the area A is smaller than those in other areas flowing in the direction indicated by the arrow Y2 and the direction indicated by the arrow Y3. It is because the hot air simply branches in two directions on the surface of the area A and hence local stagnation of airflow can easily be generated. Consequently, the sheet area in the vicinity of the area A is low in efficiency of drying using hot air in comparison with other areas, so that the non-uniformity of drying may be resulted.

As described above, the planar heater 39 which constitutes the heater unit 40 is divided into a plurality of blocks along the width direction of the sheet S, so that a predetermined non-uniform temperature distribution can be set by individually adjusting the heating capacities thereof. The temperature distribution of the contact surface of the heat conductor plate 38 is set so that a relatively larger amount of heat in comparison with other areas is imparted from the belt 34 to an area of a sheet surface where the blowing amount of the hot air from the hot air generating unit 42 is relatively small. In this example, the heating capacity (temperature) of the planar heater 39*b* corresponding to the area A is set to be larger than the heating capacity (temperature) of other planar heaters 39*a*, 39*c*.

The heat energy is transferred from the contact surface of the heat conductor plate 38 to the inner surface 34*b* of the belt 34, and then is transferred to the outer surface 34*a*. During the action of the printing apparatus, the belt 34 rotates continuously. Consequently, the outer surface 34*a* which comes into contact with the sheet of the belt 34 has a uniform temperature distribution in the direction of sheet conveyance, and has a predetermined non-uniform temperature distribution having a higher temperature at the center than the periphery in the direction of the width of the sheet.

When the sheet passes through the drying unit 8, drying energy of the hot air is imparted to the surface of the sheet by the hot air generating unit 42. At the same time, drying energy is imparted to the back surface of the sheet from the belt 34 which is elevated in temperature by the heater unit 40. Therefore, drying with high degree of efficiency is achieved from both sides of the sheet. In this case, the unevenness of the drying energy imparted by the hot air is substantially cancelled by the predetermined uneven temperature distribution of the belt set by the heater unit, so that a uniform drying energy is imparted to the entire sheet. In this manner, high-speed and uniform drying are both achieved at a high level, whereby the printing apparatus being capable of duplex printing, which achieves a high-speed and high-quality image formation, is realized.

The planar heater 39 may have a structure divided into a plurality of blocks (the planar heaters 39*d*, 39*e*, and 39*f* in FIG. 4) arranged in the direction of sheet conveyance. Outlet and inlet ports (inlet port 51 and outlet port 52) of the drying unit 8 for the sheet S are openings in the state of being opened. Since the outside air enters the outlet and inlet ports from the openings, the temperature of the gas is lowered to a level below the temperature at the center in the interior of the drying unit, so that the drying performance using the hot air is relatively lowered. In order to compensate this event, the heating capacities (temperatures) of a planar heater 39*d* corresponding to the area near the inlet port 51 of the drying unit and a planar heater 39*f* corresponding to the area near the outlet port 52 are set to be higher than that of a planar heater 39*e* at the center. Accordingly, the drying performance for the entire sheet can be made more uniform. In addition, by dividing the planar heater 39 into a plurality of blocks both in the width direction and the direction of conveyance of the sheet S, finer temperature distribution control is achieved. If the temperature distribution of the contact surface of the heater unit can be set non-uniformly, the planar heater 39 does not necessarily have to be physically divided, and maybe a single planer heater which is not divided in appearance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-099150 filed Apr. 22, 2010, which is hereby incorporated by reference herein in its entirety.

What is claimed is:

1. An apparatus for drying a sheet, comprising:

a rotatable belt having an outer surface and an inner surface, a part of the outer surface being into contact with a sheet;

a plurality of rollers including a first roller and a second roller adjacent to each other, the plurality of rollers being pressed against the outer surface with the sheet being held between the plurality of rollers and the outer surface;

a blowing mechanism configured to blow hot air from between the first roller and the second roller toward the sheet through an ejection port provided at a position corresponding to a portion between the first roller and the second roller, wherein the hot air blown onto the sheet through the ejection port is separated to flow toward opposite two directions along a path between the first roller and the second roller a heating unit including a contact surface coming into contact with the inner surface and a plurality of heaters arranged along a direction of a sheet width; and a housing accommodating the rotatable belt, the rollers, the blowing mechanism and the heating unit, wherein the hot air circulates in the housing, wherein one of the heaters corresponding to an area where the hot air through the ejection port is blown and separated supplies a larger heating amount to the rotatable belt than each of the heaters in other areas.

2. The apparatus according to claim 1, wherein the blowing mechanism includes a heater and a fan so that the hot air circulates in the housing.

3. The apparatus according to claim 1, wherein the heater includes planar heaters arranged in a direction of conveyance of the sheet by the belt, and the planar heater in an area corresponding to the area close to an opening of the apparatus housing supplies a larger heating amount than the planar heaters in other areas.

4. The apparatus according to claim 1, wherein the ejection port is a slit-shaped ejection port extending along the direction.

5. The apparatus according to claim 1, wherein a coefficient of friction between the outer surface and the sheet is greater than a coefficient of friction between the inner surface and the contact surface.

6. The apparatus according to claim 1, wherein the material forming the contact surface is aluminum, copper, stainless steel, or a carbon graphite resin.

7. An apparatus for performing duplex printing comprising:

a sheet feeding unit configured to feed a sheet along a path, wherein the sheet is continuous;

a printing unit, disposed in the path, configured to perform inkjet printing on the sheet;

a cutter unit, disposed downstream of the printing unit in the path, configured to cut the sheet;

a drying unit, disposed downstream of the cutter unit in the path, configured to dry the sheet printed in the printing unit; and a reverse unit configured to reverse the sheet that has passed through the drying unit, wherein the drying unit includes:

a rotatable belt having an outer surface and an inner surface, a part of the outer surface being into contact with the sheet;

a plurality of rollers including a first roller and a second roller adjacent to each other, the plurality of rollers being pressed against the outer surface with the sheet being held between the plurality of rollers and the outer surface;

a blowing mechanism configured to blow hot air from between the first roller and the second roller toward the sheet through an ejection port provided at a position corresponding to a portion between the first roller and the second roller, wherein the hot air blown onto the sheet through the ejection port is separated to flow toward opposite two directions along a path between the first roller and the second roller;

a heating unit including a contact surface coming into contact with the inner surface and a plurality of heaters arranged along a direction of a sheet width; and a housing accommodating the rotatable belt, the rollers, the blowing mechanism and the heating unit, wherein the hot air circulates in the housing, wherein one of the heaters in an ar a corresponding to an area where the hot air through the ejection port is blown and separated supplies a larger heating amount to the rotatable belt than each of the heaters in other areas.

8. The apparatus according to claim 7, wherein in the duplex printing, the printing unit prints a plurality of images on a first surface of the sheet fed from the sheet feeding unit, the sheet printed on the first surface passes through the drying unit and is led to the reverse unit, the reverse unit feeds the reversed sheet to the printing unit, the printing unit prints a plurality of images on a second surface that is a back of the first surface of the sheet fed from the reverse unit, the cutter unit cuts the sheet printed on the second surface into a plurality of cut sheets, and the cut sheets pass through the drying unit and are ejected.

9. The apparatus according to claim 7, further comprising:

a humidifying unit configured to generate humidifying gas;

wherein gas or heat discharged from the drying unit is used to generate the humidifying gas by the humidifying unit.

10. The apparatus according to claim 7, wherein the blowing mechanism includes a heater and a fan so that the hot air circulates in the housing.

11. The apparatus according to claim 7, wherein the heater includes planar heaters arranged in a direction of conveyance of the sheet by the belt, and the planar heater in an area corresponding to the area close to an opening of the apparatus housing supplies a larger heating amount than the planar heaters in other areas.

12. The apparatus according to claim 7, wherein the ejection port is a slit-shaped ejection port extending along the direction.

13. The apparatus according to claim 7, wherein a coefficient of friction between the outer surface and the sheet is greater than a coefficient of friction between the inner surface and the contact surface.

14. The apparatus according to claim 7, wherein the material forming the contact surface is aluminum, copper, stainless steel, or a carbon graphite resin.

* * * * *